US009161012B2

(12) United States Patent
Mihelich et al.

(10) Patent No.: US 9,161,012 B2
(45) Date of Patent: Oct. 13, 2015

(54) VIDEO COMPRESSION USING VIRTUAL SKELETON

(75) Inventors: Mark Mihelich, Seattle, WA (US);
Kevin Geisner, Mercer Island, WA (US);
Mike Scavezze, Bellevue, WA (US);
Stephen Latta, Seattle, WA (US);
Daniel McCulloch, Kirkland, WA (US);
Brian Mount, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1000 days.

(21) Appl. No.: 13/299,109

(22) Filed: Nov. 17, 2011

(65) Prior Publication Data
US 2013/0127994 A1    May 23, 2013

(51) Int. Cl.
| | |
|---|---|
| H04N 13/00 | (2006.01) |
| H04N 7/14 | (2006.01) |
| H04N 13/02 | (2006.01) |
| G06T 9/00 | (2006.01) |
| H04N 19/20 | (2014.01) |

(52) U.S. Cl.
CPC ............ *H04N 13/0059* (2013.01); *G06T 9/001* (2013.01); *H04N 7/147* (2013.01); *H04N 13/0271* (2013.01); *H04N 19/20* (2014.11); *H04N 2213/003* (2013.01)

(58) Field of Classification Search
CPC ................................................ G08B 13/19602
See application file for complete search history.

(56) References Cited

U.S. PATENT DOCUMENTS

| | | | |
|---|---|---|---|
| 5,774,591 A | 6/1998 | Black et al. | |
| 5,995,518 A * | 11/1999 | Burns et al. | 370/503 |
| 6,047,088 A * | 4/2000 | van Beek et al. | 382/243 |
| 6,256,418 B1 * | 7/2001 | Rehg et al. | 382/236 |
| 6,661,420 B2 | 12/2003 | Arai et al. | |
| 6,879,324 B1 * | 4/2005 | Hoppe | 345/423 |
| 7,342,580 B1 * | 3/2008 | Peterson | 345/418 |
| 7,532,215 B2 * | 5/2009 | Yoda et al. | 345/427 |
| 7,616,782 B2 | 11/2009 | Badawy | |
| 8,913,809 B2 * | 12/2014 | Kapur et al. | 382/128 |
| 2001/0056477 A1 | 12/2001 | McTernan et al. | |
| 2005/0117019 A1 * | 6/2005 | Lamboray et al. | 348/159 |
| 2006/0204113 A1 * | 9/2006 | Wang et al. | 382/236 |
| 2006/0209961 A1 * | 9/2006 | Han et al. | 375/240.16 |

(Continued)

OTHER PUBLICATIONS

Lien, et al., "Skeleton-Based Data Compression for Multi-Camera Tele-immersion System", Retrieved at <<http://citeseerx.ist.psu.edu/viewdoc/download?doi=10.1.1.99.2535&rep=rep1&type=pdf>>, Proceedings of the International Symposium on Visual Computing, Nov. 2007, pp. 1-10.

*Primary Examiner* — Sath V Perungavoor
*Assistant Examiner* — Peter D Le
(74) *Attorney, Agent, or Firm* — Dan Choi; Judy Yee; Micky Minhas

(57) ABSTRACT

Optical sensor information captured via one or more optical sensors imaging a scene that includes a human subject is received by a computing device. The optical sensor information is processed by the computing device to model the human subject with a virtual skeleton, and to obtain surface information representing the human subject. The virtual skeleton is transmitted by the computing device to a remote computing device at a higher frame rate than the surface information. Virtual skeleton frames are used by the remote computing device to estimate surface information for frames that have not been transmitted by the computing device.

20 Claims, 4 Drawing Sheets

(56) References Cited

U.S. PATENT DOCUMENTS

| | | |
|---|---|---|
| 2007/0127774 A1* | 6/2007 | Zhang et al. .................. 382/103 |
| 2007/0160298 A1* | 7/2007 | Murakami et al. ............ 382/238 |
| 2007/0285419 A1 | 12/2007 | Givon |
| 2010/0111370 A1* | 5/2010 | Black et al. ................... 382/111 |
| 2010/0128446 A1* | 5/2010 | DiPoala ........................ 361/729 |
| 2011/0025853 A1 | 2/2011 | Richardson |
| 2011/0050878 A1* | 3/2011 | Wells et al. ..................... 348/86 |
| 2014/0009561 A1* | 1/2014 | Sutherland et al. ........ 348/14.05 |

* cited by examiner

VIDEO COMPRESSION USING VIRTUAL SKELETON

BACKGROUND

Digital media content such as videos or dynamic animations occupy substantial data capacity on communications networks such as the Internet. Applications that support real-time streaming of digital media content are particularly sensitive to transmission latency and/or bandwidth limitations of a communications network. Compression algorithms have been applied to digital media content to reduce the amount of data transmitted over communications networks while maintaining acceptable levels of fidelity. Accordingly, compression algorithms provide one of several limiting factors for the transmission of digital media content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to embodiments that solve any or all disadvantages noted in any part of this disclosure.

Embodiments relating to video compression using a virtual skeleton are disclosed. As one example, optical sensor information captured via one or more optical sensors imaging a scene that includes a human subject is received by a computing device. The optical sensor information is processed by the computing device to model the human subject with a virtual skeleton, and to obtain surface information representing the human subject. The virtual skeleton is transmitted to a remote computing device at a higher frame rate than the surface information. Some virtual skeleton frames are used by the remote computing device to estimate surface information for frames in which the surface information has not been transmitted to the remote computing device.

DETAILED DESCRIPTION

Data rich aspects of optical sensor information, such as visible spectrum and/or depth information (i.e., surface information) are transmitted to a remote computing device at reduced frame rates to conserve bandwidth and/or reduce transmission latency over communications networks. A virtual skeleton representing a human subject within a scene is modeled with the optical sensor information and is transmitted to the remote computing device at a higher frame rate than the surface information. The additional frames of the virtual skeleton are used by the remote computing device to estimate surface information for frames that have not been transmitted to the remote computing device, enabling the estimated surface information to be rendered by the remote computing device for presentation via a graphical display.

Figure 1:
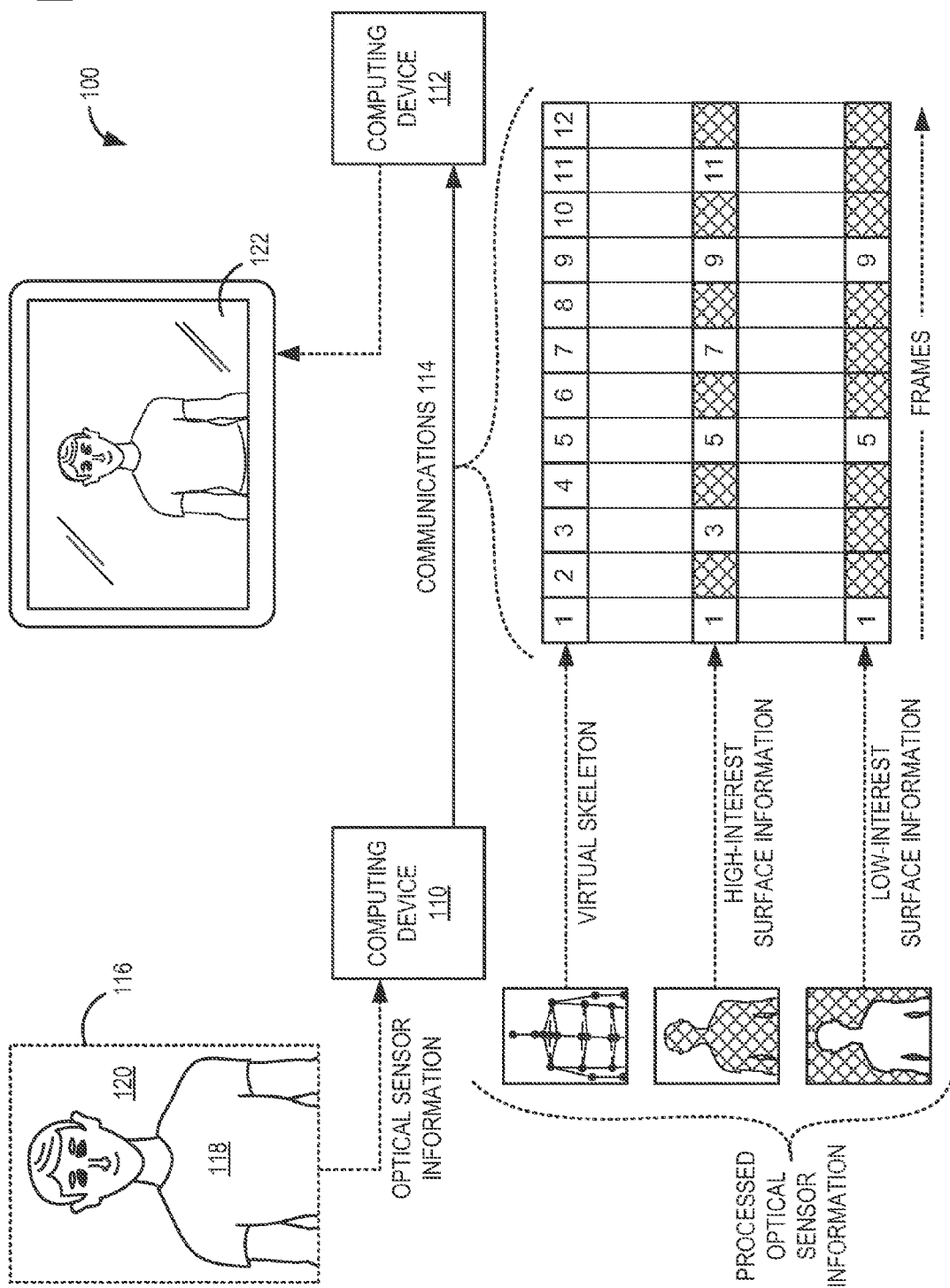
FIG. 1 is a schematic diagram depicting an example computing system according to one disclosed embodiment.

FIG. 1 is a schematic diagram depicting an example computing system 100 according to one disclosed embodiment. Computing system 100 includes a computing device 110 communicating with another computing device 112. Communications between computing devices 110 and 112 may be transmitted over a communications network such as a wide-area network (WAN) (e.g., the Internet) and/or a local area network. Computing device 112 may be remotely located from computing device 110 in at least some embodiments.

Example communications 114 transmitted by computing device 110 to computing device 112 may include processed optical sensor information in the form of a virtual skeleton and corresponding surface information. Surface information may include visible spectrum information (e.g., RGB information) and/or depth information, for example. The optical sensor information may be received by computing device 110 from one or more optical sensors capturing a scene 116. Scene 116 may include, for example, a human subject 118 and a background region 120.

Computing device 110 processes the received optical sensor information to model human subjects with a virtual skeleton, and to obtain surface information representing objects within the scene, including the human subject. For example, a high-interest region (e.g., human subject 118 or a portion thereof) may be represented by high-interest surface information, and a low-interest region (e.g., background region 120 or another portion of human subject 118) may be represented by low-interest surface information. As another example, the high-interest region may include a particular region of the human subject such as a mouth region or facial region, and the low-interest region may include other regions of the human subject and/or background region surrounding the human subject.

The virtual skeleton may be transmitted at a higher frame rate than at least some of the surface information. For example, low-interest surface information may be transmitted at a lower frame rate than the virtual skeleton. High-interest surface information may be transmitted at a higher frame rate than the low-interest surface information, and may be transmitted at a frame rate that is less than or equal to the frame rate of the virtual skeleton.

Computing device 112 receives the virtual skeleton and surface information transmitted by computing device 110 at the respective frame rates. Computing device 112 estimates frames of surface information that have not been transmitted from computing device 110 using the additional virtual skeleton frames that were transmitted at the higher frame rate.

Figure 2:
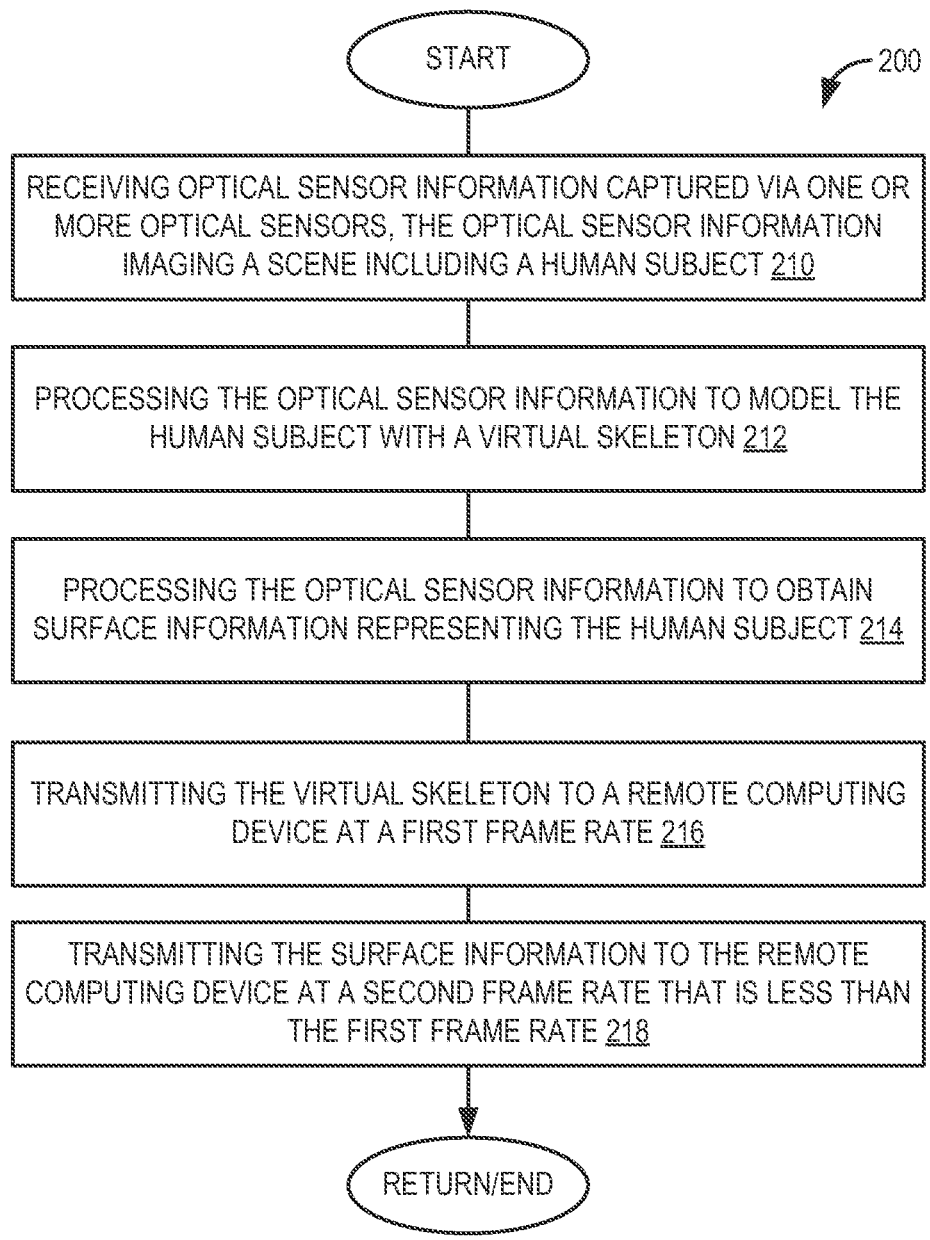
FIG. 2 is a flow diagram depicting an example method for a computing device according to one disclosed embodiment.

FIG. 2 is a flow diagram depicting an example method 200 for a computing device according to one disclosed embodiment. Method 200 may be performed by previously described computing device 110 of FIG. 1, for example.

At 210, the method includes receiving optical sensor information imaging a scene captured via one or more optical sensors. As one example, a scene captured via the one or more optical sensors may include a human subject. However, a scene may include other suitable objects of interest in addition to or as an alternative to the human subject. Furthermore, a scene may include multiple human subjects that may be independently tracked and modeled by the computing device.

As an illustrative example, optical sensor information may be received from the one or more optical sensors over a period of time during which a human subject moves within a scene.

Such movement by the human subject may take the form of facial movement (e.g., talking, an expression, etc.) or bodily movement (e.g., movement of an arm, a leg, etc.). The optical sensor information may include a number of frames ordered in time over the period that the scene was captured by the one or more optical sensors to create a video or dynamic animation. As nonlimiting examples, the optical sensor information may include thirty or sixty frames of information per second.

At 212, the method includes processing the optical sensor information to model the human subject with a virtual skeleton. The virtual skeleton may include or may be defined by a plurality of points or vertices in two-dimensional or three-dimensional space. For example, a human subject may be modeled with a virtual skeleton having several, tens, hundreds, or even more points or vertices. For a given frame, these points or vertices may be associated with corresponding visible spectrum and/or depth information obtained from the optical sensor information. Further discussion of an example virtual skeleton is provided with reference to FIG. 5.

At 214, the method includes processing the optical sensor information to obtain surface information representing the human subject. The surface information may include visible spectrum information and/or depth information obtained from one or more of the optical sensors. Visible spectrum information may include, for example, color (e.g., RGB information), hue, brightness, contrast, etc. for individual pixels or regions of a scene. Depth information may include a depth value for individual pixels or regions of a scene to provide an indication of a distance in a third dimension.

The depth information may be registered to the surface information so that a pixel of the depth information images the same part of a scene as a corresponding pixel of the surface information. The depth and surface information may have the same or different resolutions. For example, the depth information may have a lower resolution than the surface information so that multiple pixels of surface information are registered to a single pixel of depth information.

At 216, the method includes transmitting the virtual skeleton to a remote computing device at a first frame rate. At 218, the method includes transmitting the surface information to the remote computing device at a second frame rate that is less than the first frame rate. As depicted in FIG. 1, surface information may be transmitted at a plurality of different frame rates, such as a relatively higher frame rate for high-interest surface information and a relatively lower frame rate for low-interest surface information.

In some embodiments, the first frame rate for the virtual skeleton may be an integer multiple of the second frame rate for the surface information. For example, the first frame rate may be 30 frames per second and the second frame rate may be 10 frames per second corresponding to a 3:1 integer multiple. By using a frame rate for the virtual skeleton that is an integer multiple of the surface information, frames of the virtual skeleton may be aligned with corresponding frames of the surface information to form base frames. It will be appreciated that other suitable frame rates and/or multiples thereof may be used, including non-integer multiples. The term "base frame" is used herein to denote a frame for which both the virtual skeleton and corresponding surface information have been transmitted in contrast to frames in which the virtual skeleton has been transmitted without corresponding surface information.

The virtual skeleton and surface information, or portions thereof, may be transmitted as a common information packet, message, or set of messages. For example, some or all of the messages transmitted by the computing device may include one or more frames of the virtual skeleton or a portion of a frame of the virtual skeleton, and may include one or more frames of surface information or a portion of a frame of the surface information. Alternatively, the virtual skeleton and surface information, or portions thereof, may be transmitted as two or more information packets, messages, or sets of messages.

In some embodiments, an individual frame of the surface information may include a greater amount of data than an individual frame of the virtual skeleton. Accordingly, a substantial amount of data may be withheld from transmission to reduce bandwidth and/or transmission latency by the computing device transmitting the surface information at a lower frame rate than the virtual skeleton.

In some embodiments, method 200 may further include identifying a high-interest region of the human subject, processing the optical sensor information to obtain high-interest surface information representing the high-interest region of the human subject, and transmitting the high-interest surface information to the remote computing device at a third frame rate that is greater than the second frame rate.

As one example, the high-interest region of the human subject may correspond to a facial region of the human subject or a portion thereof, such as a mouth region. By identifying the mouth region of the human subject as a high-interest region (e.g., at least while the human subject is speaking) the frame rate of the surface information representing the mouth of the human subject may be increased to account for rapid movement of the speaker's mouth.

As another example, a high-interest region of the human subject may correspond to a region of the human subject moving above a threshold speed. For example, responsive to a human subject moving an appendage in excess of the threshold speed, a region of the scene corresponding to the appendage may be identified as a high-interest region of the human subject for which the frame rate may be increased to account for rapid movement of the appendage.

As yet another example, a high-interest region of the human subject may correspond to a region where at least a threshold number of pixels and/or a threshold density of pixels within the region change from one frame to the next frame. Such a change may be indicated by a change of color, a change of brightness, or other suitable pixel change.

In some embodiments, method 200 may further include identifying a background region of the scene excluding the human subject, processing the optical sensor information to obtain background surface information representing the background region of the scene, and transmitting the background surface information to the remote computing device at a third frame rate that is less than the second frame rate. The background region of the scene may correspond to the previously described low-interest region for which low interest surface information may be transmitted at a lower frame rate than high-interest surface information. Hence, regions of the scene that are deemed less important or that are changing less rapidly between frames may be suitably described by a lower frame rate, due in part to the receiving computing device being able to reconstruct those regions of the scene in a form that is acceptable to the viewer.

In some embodiments, method 200 may further include varying a frame rate of the surface information responsive to an operating parameter. Example operating parameters include: (1) a distance, speed, or acceleration by which that the human subject (or virtual skeleton) moves within a scene between frames; (2) a data transmission rate of a communications network over which the surface information is transmitted to the remote computing device; (3) a user input received at the computing device indicating a frame rate control setting; (4) a characteristic of a visible spectrum component of the surface information such as color, hue, brightness, etc. of a region of the scene; (5) an audio level of the scene or a region thereof detected via a microphone; or (6) another suitable operating parameter.

For example, a frame rate of the surface information may be increased as an audio level of the scene increases. As another example, the frame rate of the surface information may be increased as a distance, speed, or acceleration of a human subject or other object within the scene increases. As yet another example, a frame rate of the surface information may be increased as a data transmission rate of the communications network increases.

In some embodiments, method 200 may further include identifying a location source of audio within the scene (e.g., via one or more microphones), processing the optical sensor information to obtain surface information for a region of the scene containing the location source of audio, and transmitting the surface information for the region of the scene containing the location source of the audio at a third frame rate higher than the second frame rate. For example, a mouth region of a human actor may be identified as the location source of audio within the scene for which surface information may be transmitted at a higher frame rate than other surface information to account for anticipated movement of the mouth region of the human subject.

In some embodiments, method 200 may further include identifying a stereoscopic overlap region of the scene for two or more of the optical sensors. The stereoscopic overlap region is defined as a region of the scene that is observed by two or more of the optical sensors. The method may include processing the optical sensor information to obtain surface information for the stereoscopic overlap region of the scene, and the surface information for the stereoscopic overlap region of the scene may be transmitted at a different frame rate than non-overlapping regions (e.g., a region observed by only one optical sensor of a stereo optical sensor pair). For example, the stereoscopic overlap region of the scene may correspond to a high-interest region (transmitted at a higher frame rate) and the non-overlapping region of the scene may correspond to a low-interest region (transmitted a lower frame rate).

Figure 3:
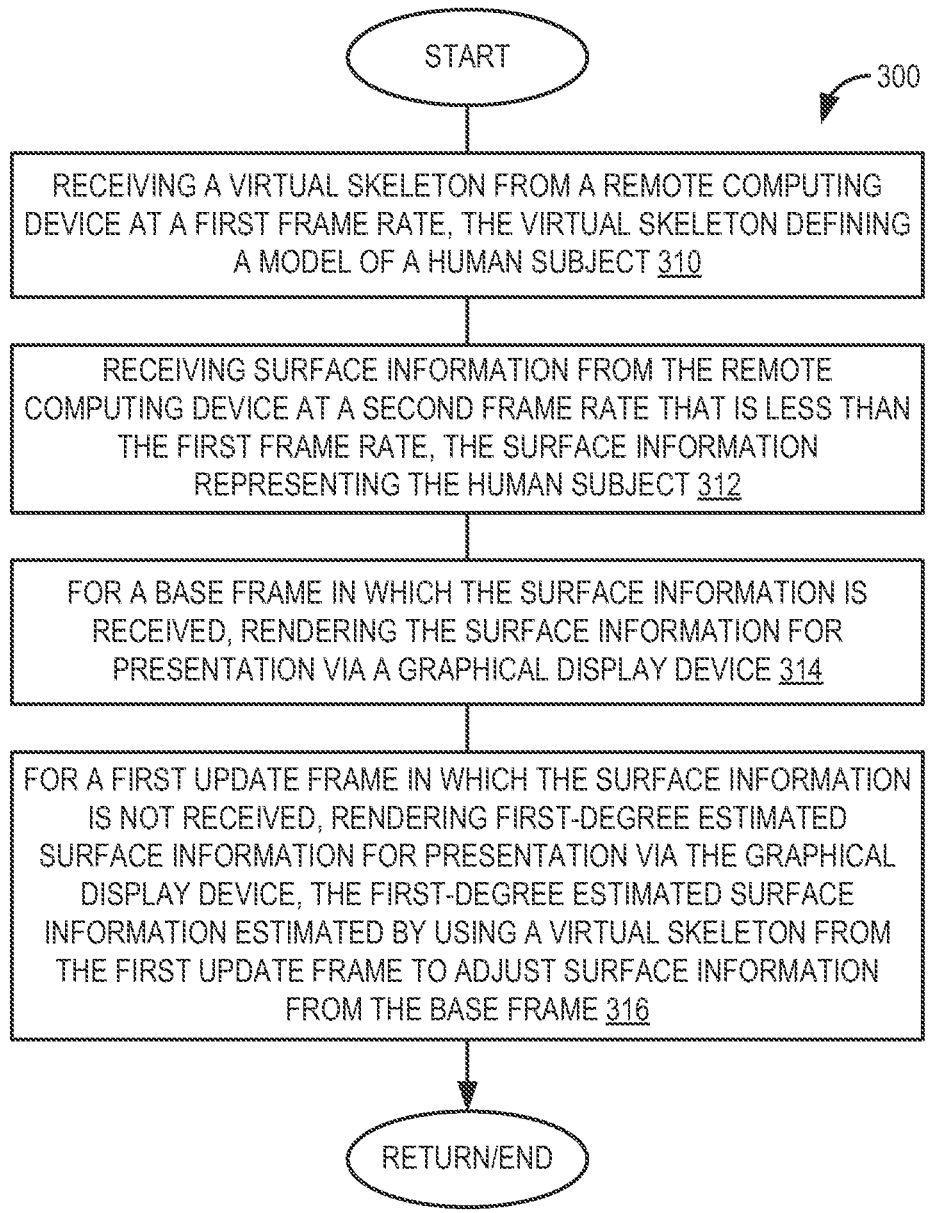
FIG. 3 is flow diagram depicting another example method for a computing device according to one disclosed embodiment.

FIG. 3 is a flow diagram depicting an example method 300 for a computing device according to one disclosed embodiment. Method 300 may be performed by previously described computing device 112 of FIG. 1, for example.

At 310, the method includes receiving a virtual skeleton from a remote computing device at a first frame rate. At 312, the method includes receiving surface information from the remote computing device at a second frame rate that is less than the first frame rate. The virtual skeleton and surface information received from the remote computing device may refer to the previously described virtual skeleton and surface information transmitted in method 200 of FIG. 2. For example, the virtual skeleton may define a model of a human subject, and the surface information may include visible spectrum information and/or depth information. The virtual skeleton and surface information may be received from the remote computing device over a communications network.

At 314, the method includes, for a base frame in which the surface information is received, rendering the surface information for presentation via a graphical display device. If the graphical display device forms part of or is integrated with the computing device, then the computing device may present the rendered surface information via the graphical display device. If the graphical display device is external or otherwise separate from the computing device, then the computing device may transmit the rendered surface information to the graphical display device where it may be presented.

At 316, the method includes, for a first update frame in which the surface information is not received, rendering first-degree estimated surface information for presentation via the graphical display device. The first-degree estimated surface information may be estimated by using a virtual skeleton from the first update frame to adjust surface information from the base frame. As one example, the base frame may correspond to a received frame of surface information preceding the first update frame. As another example, the base frame may correspond to a received frame of surface information following the first update frame. Received frames of the virtual skeleton and/or surface information optionally may be buffered at the computing device to enable the computing device to interpolate a frame of surface information using a frame preceding the estimated frame and a frame following the estimated frame.

As an illustrative example, the computing device receives a base frame of surface information (e.g., visual spectrum information and/or depth information) along with the corresponding virtual skeleton. The computing device may estimate a frame of surface information (e.g., a first-degree estimated frame) by incrementally extrapolating from the base frame of surface information using intermediary frames of the virtual skeleton received between base frames.

Subsequent frames of surface information may be estimated by the computing device. For example, second-degree estimated surface information (e.g., a second-degree estimated frame following the first degree estimated frame) may be estimated by extrapolating from the base frame of surface information and/or the first-degree estimated frame using a virtual skeleton from a second update frame to adjust surface information. Again, the base frame may correspond to a received frame of surface information preceding the first update frame, or may correspond to a received frame of surface information following the second update frame.

The computing device may use base frame surface information to create a mesh (e.g., a polygonal mesh). In particular, the base frame surface information may include depth information, and the depth information can be used to assess a three-dimensional shape of a subject. The mesh can be fit to this three-dimensional shape so that the mesh models the subject. The virtual skeleton associated with the base frame also may be fit to the mesh. For subsequent frames for which an updated virtual skeleton is received, but for which updated surface information is not received, the mesh can be adjusted in accordance with the updated virtual skeleton. Visual spectrum information (e.g., an RGB/color texture) from the previously received base frame of surface information may then be applied to the updated mesh. In other words, a base frame image can be skinned to a mesh that is updated in accordance with a virtual skeleton from an update frame.

In some embodiments, estimated surface information may be estimated by using a virtual skeleton from the first update frame to adjust surface information from the base frame and at least one other frame. For example, a base frame may correspond to a received frame of surface information preceding a first update frame and the at least one other frame may correspond to a received frame of surface information following the first update frame. Accordingly, estimated surface information may be estimated from a combination of two or more frames that have been received as a transmission from a remote computing device. Again, buffering may be used at the computing device to enable two or more frames to be used in combination to estimate intermediate frames of surface information.

As previously discussed, surface information received at a second frame rate may correspond to a high-interest region of the human subject. Method 300 may further include receiving surface information at a third frame rate less than the second frame rate. For example, the surface information received at the third frame rate may correspond to a low interest region such as a non-facial region of the human subject and/or a background region excluding the human subject.

In some embodiments, method 300 may further include sending control information to the remote computing device via a communications network. The control information may direct the remote computing device to increase or decrease a frame rate of the surface information (e.g., the second frame rate or third frame rate) and/or a frame rate of the virtual skeleton (e.g. the first frame rate). The remote computing device receives the control information and may adjust the frame rate responsive to the control information. Hence, a computing device may be provided with control over the frame rates at which information is transmitted by a remote computing device.

As previously described with reference to FIG. 1, the above described methods and processes of FIGS. 2 and 3 may be tied to a computing system including one or more computing devices. The methods and processes described herein may be implemented as a computer application, computer service, computer API, computer library, and/or other computer program product.

Figure 4:
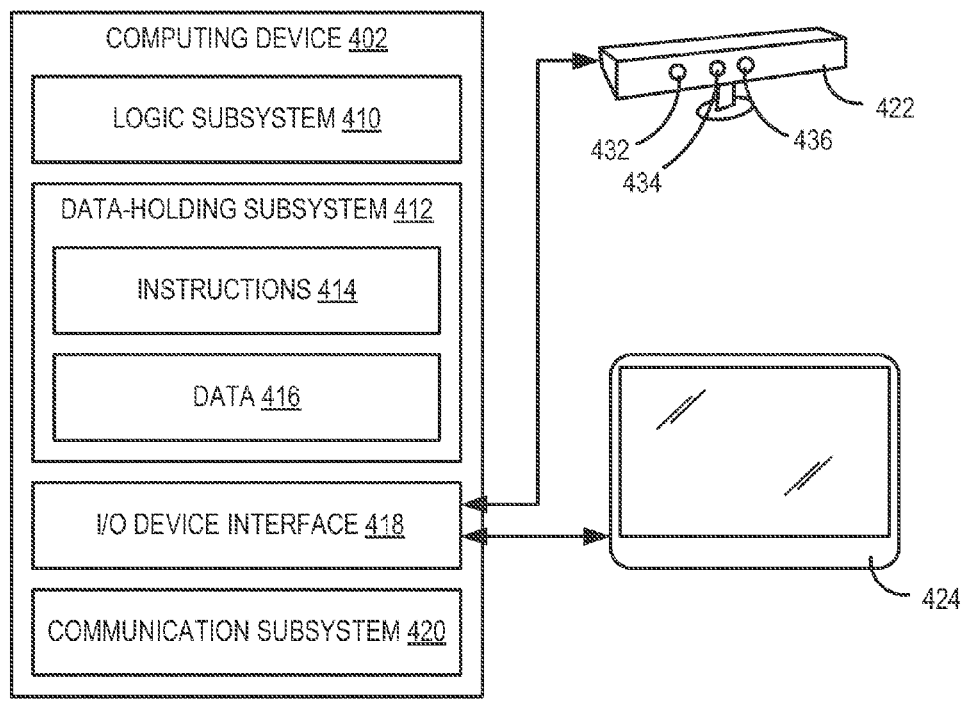
FIG. 4 is a schematic diagram depicting further aspects of an example computing system according to one disclosed embodiment.

FIG. 4 is a schematic diagram depicting further aspects of a computing system including a computing device. FIG. 4 schematically shows a non-limiting computing system 400 that may perform one or more of the above described methods and processes. Computing system 400 is shown in simplified form including a computing device 402. Computing device 402 may correspond to previously described computing devices 110 or 112 of FIG. 1.

It is to be understood that virtually any computer architecture may be used without departing from the scope of this disclosure. In different embodiments, computing system 400 may include or take the form of a mainframe computer, server computer, desktop computer, laptop computer, tablet computer, home entertainment computer, network computing device, mobile computing device, mobile communication device, gaming device, etc.

Computing system 400 includes a logic subsystem 410 and a data-holding subsystem 412. Computing system 400 may optionally include a display subsystem 424 (e.g., a graphical display device), communication subsystem 420, and/or other components not shown in FIG. 4. Computing system 400 may also optionally include user input devices such as keyboards, mice, game controllers, cameras, microphones, and/or touch screens, for example.

Logic subsystem 410 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 412 may include one or more physical, non-transitory, devices configured to hold data 416 and/or instructions 414 executable by the logic subsystem to implement the herein described methods and processes. When such methods and processes are implemented, the state of data-holding subsystem 412 may be transformed (e.g., to hold different data).

Data-holding subsystem 412 may include removable media and/or built-in devices. Data-holding subsystem 412 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 412 may include devices with one or more of the following characteristics: volatile, nonvolatile, dynamic, static, read/write, read-only, random access, sequential access, location addressable, file addressable, and content addressable. In some embodiments, logic subsystem 410 and data-holding subsystem 412 may be integrated into one or more common devices, such as an application specific integrated circuit or a system on a chip.

It is to be appreciated that data-holding subsystem 412 includes one or more physical, non-transitory devices. In contrast, in some embodiments, aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 400 that is implemented to perform one or more particular functions. In some cases, such a module, program, or engine may be instantiated via logic subsystem 410 executing instructions held by data-holding subsystem 412. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 424 may be used to present a visual representation of data held by data-holding subsystem 412. As the herein described methods and processes change the data held by the data-holding subsystem, and thus transform the state of the data-holding subsystem, the state of display subsystem 424 may likewise be transformed to visually represent changes in the underlying data. Display subsystem 424 may include one or more display devices utilizing virtually any type of technology. Such display devices may be combined with logic subsystem 410 and/or data-holding subsystem 412 in a shared enclosure, or such display devices may be peripheral display devices.

In some embodiments, display subsystem 424 may take the form of wearable glasses or goggles. The wearable glasses or goggles may include one or more graphical displays for presenting different or independent right eye and left eye components of the optical signal information captured via one or more optical sensors of a remote computing device and transmitted to the computing device as frames of a virtual skeleton and surface information. Optionally, the right eye and left eye components may collectively provide a three-dimensional viewing experience to a viewer or user.

When included, communication subsystem 420 may be configured to communicatively couple computing device 402 with one or more other computing devices. Communication subsystem 420 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing device 402 to send and/or receive messages to and/or from other devices via a network such as the Internet.

Computing system 400 may include a sensor subsystem 422. Sensor subsystem 422 may include one or more optical sensors (e.g., infrared cameras) to obtain depth information, and may include one or more optical sensors (e.g., RGB cameras) to obtain visible light information. As one example, sensor subsystem 422 may include depth cameras 432 and 436, and visible spectrum camera 434. Some optical sensors of sensor subsystem 422 may be used to obtain a combination of depth information and/or visible light information. However, other suitable sensor subsystems may be used, including sensor subsystems with one, two, three, or more optical sensors.

Depth cameras 432 and 436 may take the form of left and right cameras of a stereoscopic vision system, for example. Time-resolved images from depth cameras 432 and 436 may be registered to each other and/or images from visible spectrum camera 434, and may be combined to yield depth-resolved video.

In some embodiments, depth camera 432 and/or 436 may take the form of structured light depth cameras configured to project a structured infrared illumination comprising numerous, discrete features (e.g., lines or points). These depth cameras may be configured to image the structured illumination reflected from a scene onto which the structured illumination is projected. A depth map of the scene may be constructed based on spacings between adjacent features in the various regions of an imaged scene.

In some embodiments, depth cameras 432 and/or 436 may take the form of time-of-flight cameras configured to project a pulsed infrared illumination onto the scene. These depth cameras may be configured to detect the pulsed illumination reflected from the scene. The depth cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

Optical sensors of sensor subsystem 422 are capable of observing a scene including one or more human subjects. In particular, each optical sensor may be operable to generate an information stream of recognition information that is representative of the observed scene, and the information streams may be interpreted and modeled to identify each of the human subjects.

Sensor subsystem 422 may further include one or more microphones. These microphones may take the form of a multi-array microphone system that enables a computing device to identify a location of an audio source within a scene.

Figure 5:
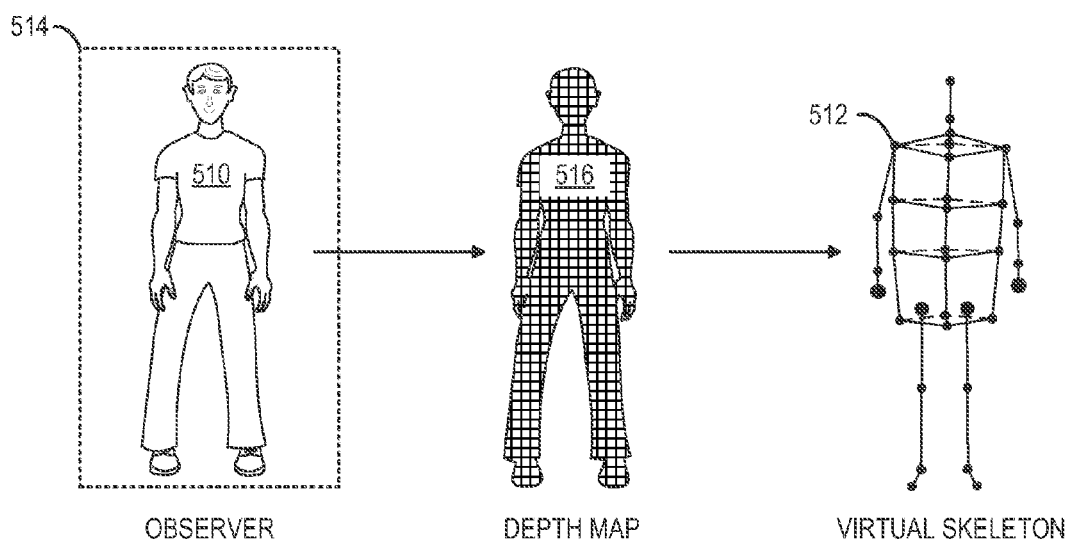
FIG. 5 is a schematic diagram depicting an example processing pipeline according to one disclosed embodiment.

FIG. 5 shows a simplified processing pipeline in which a human subject 510 is modeled as a virtual skeleton 512. It will be appreciated that a processing pipeline may include additional steps and/or alternative steps than those depicted in FIG. 5 without departing from the scope of this disclosure.

As shown in FIG. 5, the three-dimensional appearance of human subject 510 and the rest of observed scene 514 may be imaged by one or more optical sensors (e.g., of sensor subsystem 422 of FIG. 4). One or more depth cameras may determine, for each pixel, the three dimensional depth of a surface in the observed scene 514 relative to the depth cameras. Virtually any depth finding technology may be used without departing from the scope of this disclosure.

The three dimensional depth information determined for each pixel may be used to generate depth information in the form of a depth map 516. Depth map 516 may take the form of virtually any suitable data structure, including but not limited to a matrix that includes a depth value for each pixel of the observed scene. In FIG. 5, depth map 516 is schematically illustrated as a pixilated grid of the silhouette of human subject 510. This illustration is for simplicity of understanding, not technical accuracy. It is to be understood that a depth map generally includes depth information for all pixels, not just pixels that image human subject 510.

A virtual skeleton 512 may be derived from the depth map 516 to provide a machine readable representation of human subject 510. Virtual skeleton 512 may be derived from the depth map 516 in any suitable manner to model human subject 510. In some embodiments, one or more skeletal fitting algorithms may be applied to the depth map. The present disclosure is compatible with virtually any skeletal modeling techniques.

Virtual skeleton 512 may include a plurality of joints represented by points or vertices. Each joint may correspond to a portion of human subject 510. Virtual skeletons in accordance with the present disclosure may include virtually any number of joints, each of which can be associated with virtually any number of parameters (e.g., three dimensional joint position, joint rotation, body posture of corresponding body part (e.g., mouth open, mouth closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. A method for a computing system, comprising:
   receiving optical sensor information captured via one or more optical sensors, the optical sensor information imaging a scene including a human subject;
   processing the optical sensor information to model the human subject with a virtual skeleton;
   processing the optical sensor information to obtain surface information representing the human subject;
   transmitting the virtual skeleton to a remote computing device at a first frame rate; and
   transmitting the surface information to the remote computing device at a second frame rate that is less than the first frame rate.

2. The method of claim 1, wherein the surface information includes visible spectrum information and/or depth information.

3. The method of claim 1, further comprising:
   identifying a high-interest region of the human subject; and
   processing the optical sensor information to obtain high-interest surface information representing the high-interest region of the human subject; and
   transmitting the high-interest surface information to the remote computing device at a third frame rate that is greater than the second frame rate.

4. The method of claim 3, wherein the high-interest region of the human subject corresponds to a facial region of the human subject.

5. The method of claim 3, wherein the high-interest region of the human subject corresponds to a region of the human subject moving at a speed exceeding a threshold.

6. The method of claim 1, further comprising:
   identifying a background region of the scene excluding the human subject;
   processing the optical sensor information to obtain background surface information representing the background region of the scene; and
   transmitting the background surface information to the remote computing device at a third frame rate that is less than the second frame rate.

7. The method of claim 1, wherein an individual frame of the surface information includes a greater amount of data than an individual frame of the virtual skeleton.

8. The method of claim 1, further comprising:
   varying the second frame rate of the surface information responsive to an operating parameter.

9. The method of claim 1, further comprising:
   identifying a location source of audio within the scene; and
   processing the optical sensor information to obtain surface information for a region of the scene containing the location source of audio; and
   transmitting the surface information for the region of the scene containing the location source of the audio at a third frame rate higher than the second frame rate.

10. The method of claim 1, further comprising:
    identifying a stereoscopic overlap region of the scene for two or more of the optical sensors;
    processing the optical sensor information to obtain surface information for the stereoscopic overlap region of the scene; and
    transmitting the surface information for the stereoscopic overlap region of the scene at a third frame rate higher than the second frame rate.

11. The method of claim 1, further comprising:
    at the remote computing device:
      receiving the virtual skeleton at the first frame rate;
      receiving the surface information at the second frame rate;
      for a base frame in which the surface information is received, rendering the surface information for presentation via a graphical display device; and
      for a first update frame in which the surface information is not received, rendering first-degree estimated surface information for presentation via the graphical display device, the first-degree estimated surface information estimated by using a virtual skeleton from the first update frame to adjust surface information from the base frame.

12. A method for a computing device, comprising:
    receiving a virtual skeleton from a remote computing device at a first frame rate, the virtual skeleton defining a model of a human subject;
    receiving surface information from the remote computing device at a second frame rate that is less than the first frame rate, the surface information representing the human subject;
    for a base frame in which the surface information is received, rendering the surface information for presentation via a graphical display device; and
    for a first update frame in which the surface information is not received, rendering first-degree estimated surface information for presentation via the graphical display device, the first-degree estimated surface information estimated by using a virtual skeleton from the first update frame to adjust surface information from the base frame.

13. The method of claim 12, wherein the base frame corresponds to:
    a received frame of surface information preceding the first update frame; or
    a received frame of surface information following the first update frame.

14. The method of claim 12, wherein the first-degree estimated surface information is further estimated by using a virtual skeleton from the first update frame to adjust surface information from the base frame and at least one other frame; and
    wherein the base frame corresponds to a received frame of surface information preceding the first update frame and the at least one other frame corresponds to a received frame of surface information following the first update frame.

15. The method of claim 12, wherein the surface information includes visible spectrum information and/or depth information; and
    wherein an individual frame of the surface information includes a greater amount of data than an individual frame of the virtual skeleton.

16. The method of claim 12, wherein the surface information received at the second frame rate corresponds to a high-interest region of the human subject; and
    wherein the method further comprises:
      receiving surface information at a third frame rate less than the second frame rate, the surface information received at the third frame rate corresponding to one or more of:
        a non-facial region of the human subject, and
        a background region excluding the human subject.

17. The method of claim 12, wherein receiving the virtual skeleton and surface information from the remote computing device includes receiving the virtual skeleton and surface information over a communications network including a wide area network.

18. The method of claim 12, further comprising:
sending control information to the remote computing device via a communications network, the control information directing the remote computing device to increase or decrease the second frame rate.

19. A data-holding subsystem holding instructions executable by a logic subsystem to:
receive optical sensor information captured via one or more optical sensors imaging a scene including a human subject;
process the optical sensor information to model the human subject with a virtual skeleton;
process the optical sensor information to obtain surface information representing the human subject, the surface information including visible spectrum information and depth information for a first region of the human subject and a second region of the human subject;
transmit the virtual skeleton to a remote computing device at a first frame rate; and
transmit the surface information for the first region of the human subject to the remote computing device at a second frame rate that is less than the first frame rate; and
transmit the surface information for the second region of the human subject to the remote computing device at a third frame rate that is greater than the second frame rate.

20. The data-holding subsystem of claim 19, wherein the instructions are further executable by the logic subsystem to:
identify the first region of the human subject as a body region of the human subject; and
identify the second region of the human subject as a facial region of the human subject;
wherein the third frame rate is less than or equal to the first frame rate.

* * * * *